United States Patent
Choe et al.

(10) Patent No.: US 7,447,379 B2
(45) Date of Patent: Nov. 4, 2008

(54) METHOD AND APPARATUS FOR ENHANCING LOCAL LUMINANCE OF IMAGE, AND COMPUTER-READABLE RECORDING MEDIUM FOR STORING COMPUTER PROGRAM

(75) Inventors: Won-hee Choe, Gyeongsangbuk-do (KR); Chang-yeong Kim, Gyeonggi-do (KR); Seong-deok Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 607 days.

(21) Appl. No.: 10/871,043

(22) Filed: Jun. 21, 2004

(65) Prior Publication Data

US 2005/0094892 A1    May 5, 2005

(30) Foreign Application Priority Data

Nov. 4, 2003    (KR) .................... 10-2003-0077759

(51) Int. Cl.
G06K 9/40    (2006.01)
G06K 9/00    (2006.01)

(52) U.S. Cl. ....................... 382/274; 382/167
(58) Field of Classification Search ............... 382/167, 382/274; 348/674, 95, 675, 672; 345/629, 345/63
See application file for complete search history.

(56) References Cited

U.S. PATENT DOCUMENTS

| | | | | |
|---|---|---|---|---|
| 5,132,796 A | | 7/1992 | Topper et al. ............... 348/674 |
| 5,255,093 A | | 10/1993 | Topper et al. ................ 348/95 |
| 5,394,195 A | | 2/1995 | Herman ...................... 348/675 |
| 5,808,697 A | * | 9/1998 | Fujimura et al. ............ 348/672 |
| 5,844,565 A | * | 12/1998 | Mizutani et al. ............ 345/581 |
| 6,307,980 B1 | * | 10/2001 | Quacchia .................... 382/268 |
| 6,414,659 B1 | | 7/2002 | Park et al. .................... 345/63 |
| 6,515,676 B1 | | 2/2003 | Kasai et al. ................. 345/629 |
| 6,933,970 B2 | * | 8/2005 | Koshiba et al. ............. 348/273 |
| 2005/0104974 A1 | * | 5/2005 | Watanabe et al. ........ 348/222.1 |

FOREIGN PATENT DOCUMENTS

| | | |
|---|---|---|
| EP | 0866423 | 9/1998 |
| JP | 05-127643 | 5/1993 |
| JP | 2004-45865 | 2/2004 |
| KR | 2000-0011323 | 2/2000 |
| WO | WO 00/46983 | 8/2000 |

OTHER PUBLICATIONS

Joseph et al., "A shadow Detection And Removal Algorithm For 2-D Images", 1990 IEEE, Brigham Young University, pp. 2057-2060.*

(Continued)

Primary Examiner—Brian Q Le
Assistant Examiner—Amara Abdi
(74) Attorney, Agent, or Firm—Staas & Halsey LLP

(57) ABSTRACT

A method and an apparatus enhance a local luminance of an image, and a computer-readable recording medium stores a computer program that enhances a local luminance of an image. The method includes: selecting a local area with a luminance to be compensated for from a luminance space, the luminance space representing a luminance of the input image; and compensating for the luminance of the selected local area.

13 Claims, 7 Drawing Sheets

OTHER PUBLICATIONS

Korean Patent Office Action for corresponding Korean Patent Application No. 10-2003-0077759 issued Oct. 27, 2005.

European Search Report for European Application No. 04252943.8-2218 dated Jan. 1, 2007 (in English).

Scanlan et al., "A Shadow Detection and Removal Algorithm for 2-D Images", Dept. of Electrical and Computer Engineering, Brigham Young University, 1990, pp. 2057-2060 (in English).

Kobayashi et al., "Fast Adaptive Contrast Enhancement Method for the Display of Gray-Tone Images" Systems and Computers in Japan, vol. 25, No. 13, 1994, Scripta Technica, Inc., 1995, pp. 87-94 (in English).

Chinese Office Action for corresponding Chinese Patent Application No. 2004100453826 dated Jun. 8, 2007.

Japanese Office Action for corresponding Japanese Patent Application No. 2004-320108 dated Sep. 25, 2007.

* cited by examiner

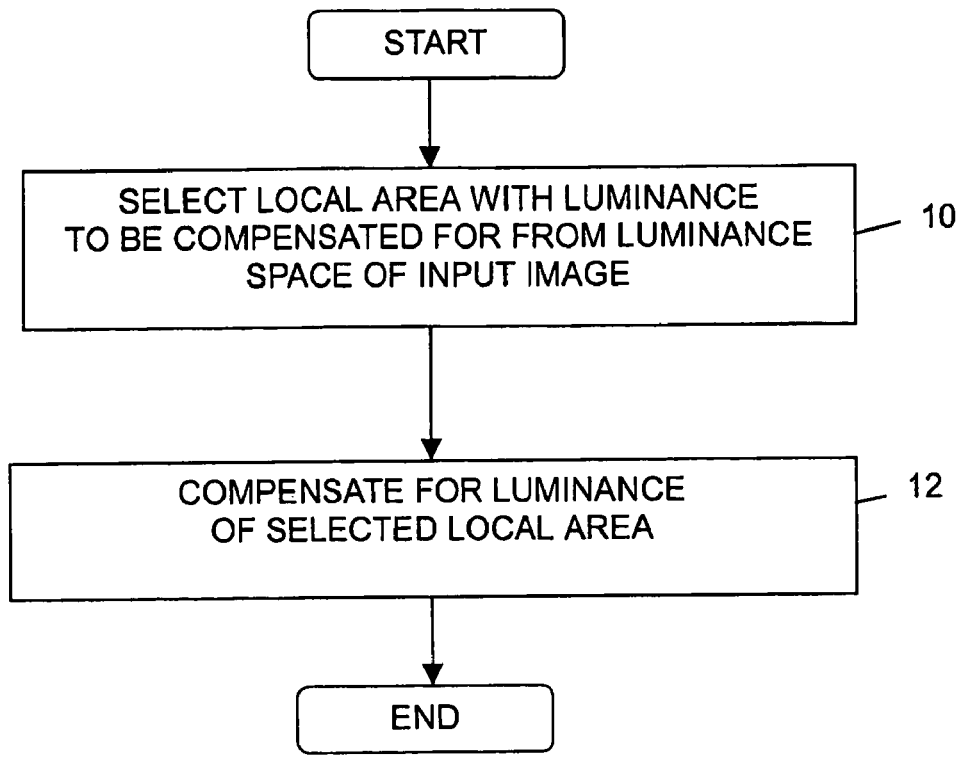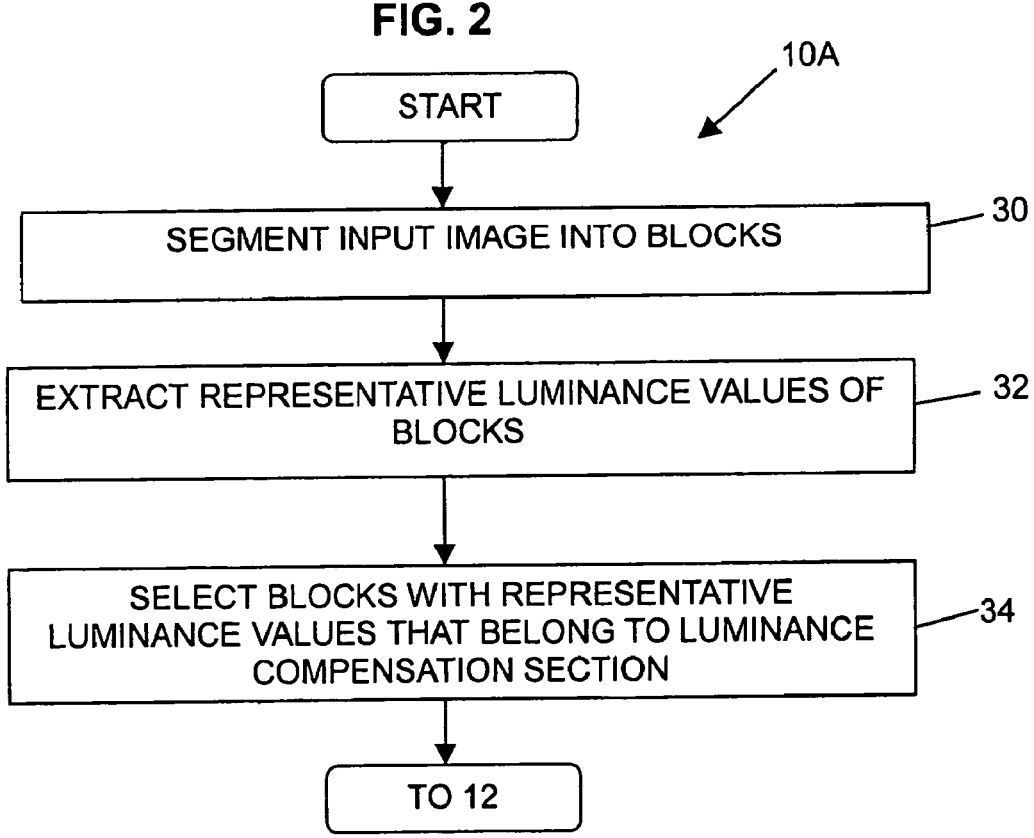

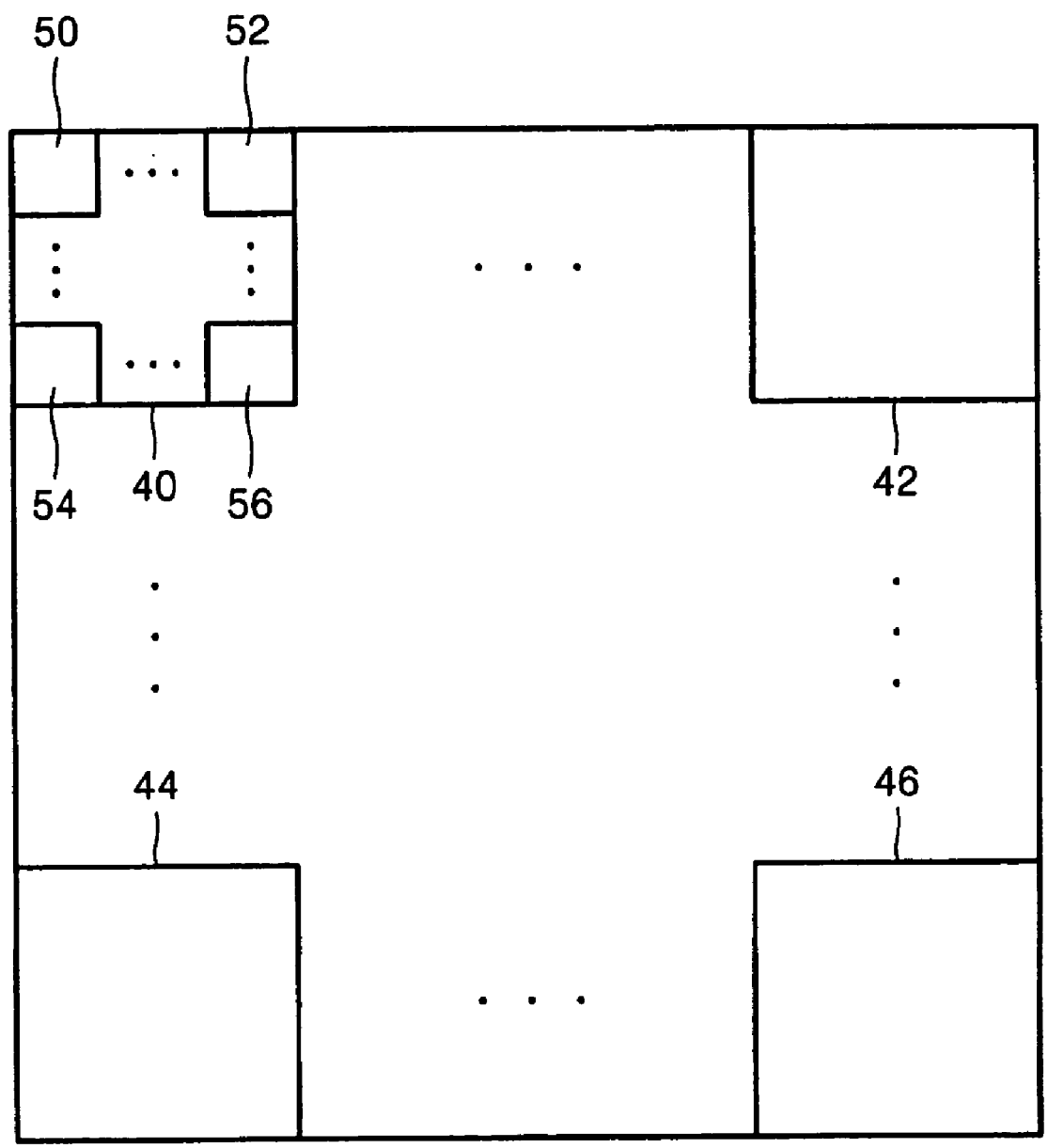

METHOD AND APPARATUS FOR ENHANCING LOCAL LUMINANCE OF IMAGE, AND COMPUTER-READABLE RECORDING MEDIUM FOR STORING COMPUTER PROGRAM

CROSS-REFERENCE TO RELATED APPLICATIONS

This application claims the priority of Korean Patent Application No. 2003-77759, filed on Nov. 4, 2003, in the Korean Intellectual Property Office, the disclosure of which is incorporated herein in its entirety by reference.

BACKGROUND OF THE INVENTION

1. Field of the Invention

The present invention relates to processing of a color image, and more particularly, to a method and an apparatus to enhance a local luminance of an image, and a computer-readable recording medium to store a computer program.

2. Description of the Related Art

In a conventional image luminance enhancing method, an ineffective luminance display ability of a color image display device may be adjusted or enhanced. The conventional image luminance enhancing method may be categorized into three classes. The conventional image luminance enhancing method belonging to the first class is disclosed in U.S. Pat. No. 5,132,796, entitled "Method and Apparatus for Digitally Processing Gamma Pedestal and Gain," U.S. Pat. No. 5,255,093, entitled "Apparatus and Method for Limiting Gain in a Digital Gamma Corrector," and U.S. Pat. No. 6,515,676, entitled "Analog Interface Display Apparatus with Color Display Control." In the conventional image luminance enhancing method belonging to the first class, parameters to adjust the overall luminance of an output image to be displayed are determined according to the overall luminance characteristic of an input image.

The conventional image luminance enhancing method belonging to the second class is disclosed in U.S. Pat. No. 5,394,195, entitled "Method and Apparatus for Performing Dynamic Gamma Contrast Control." In the conventional image luminance enhancing method belonging to the second class, parameters to compensate for the overall luminance of an output image to be displayed are determined using information on a portion of an input image, not on a portion of a luminance area of the input image which represents the luminance of the input image.

In the conventional image luminance enhancing methods belonging to the first and second classes, since a luminance of a local area of an input image cannot be compensated for, the overall luminance of the input image cannot be partially enhanced. Since the overall luminance of the input should be compensated for, time taken to compensate for the luminance of the input image is protracted.

The conventional image luminance enhancing method belonging to the third class is disclosed in U.S. Pat. No. 6,414,659, entitled "LCD Gain and Offset Value Adjustment System and Method." In the conventional image luminance enhancing method belonging to the third class, parameters are adjusted according to the luminance characteristic of a display device regardless of an input signal to compensate for the luminance of an output image to be displayed.

Accordingly, the conventional image luminance enhancing method belonging to the three classes may contribute to preventing a luminance representation ability of a display device from deteriorating due to the characteristics of the display device. However, the ineffective luminance characteristic of an input image cannot be compensated for.

SUMMARY OF THE INVENTION

The present invention provides a method of enhancing a local luminance of an image in which only a local area of a luminance space of an input image may be compensated for, the luminance space representing the luminance of the input image.

The present invention also provides an apparatus to enhance a local luminance of an image in which only a local area of a luminance space of an input image may be compensated for, the luminance space representing the luminance of the input image.

The present invention also provides a computer-readable recording medium to store a computer program to compensate for a local area of a luminance space of an input image, the luminance space representing the luminance of the input image.

According to an aspect of the present invention, a method of enhancing a local luminance of an image comprises: selecting a local area with a luminance to be compensated for from a luminance space, the luminance space representing a luminance of the input image; and compensating for the luminance of the selected local area.

According to another aspect of the present invention, an apparatus to enhance a local luminance of an image comprises: a luminance compensation area selector which selects a local area with a luminance to be compensated for from a luminance space, the luminance space representing a luminance of the input image; and an image unit which compensates for the luminance of the selected local area.

According to still another aspect of the present invention, a computer-readable recording medium stores a computer program to perform: selecting a local area with a luminance to be compensated for from a luminance space, the luminance space representing a luminance of an input image; and compensating for the luminance of the selected local area.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which:

FIG. 1 is a flowchart illustrating a method of enhancing a local luminance of an image according to an embodiment of the present invention;

FIG. 2 is a flowchart illustrating an embodiment of operation 10 of FIG. 1;

FIG. 3 is an exemplary view of an input image which is segmented into blocks;

FIG. 7 is an exemplary view illustrating luminance compensation amounts of random pixels to be compensated for;

DETAILED DESCRIPTION OF THE PREFERRED EMBODIMENTS

Figure 4:
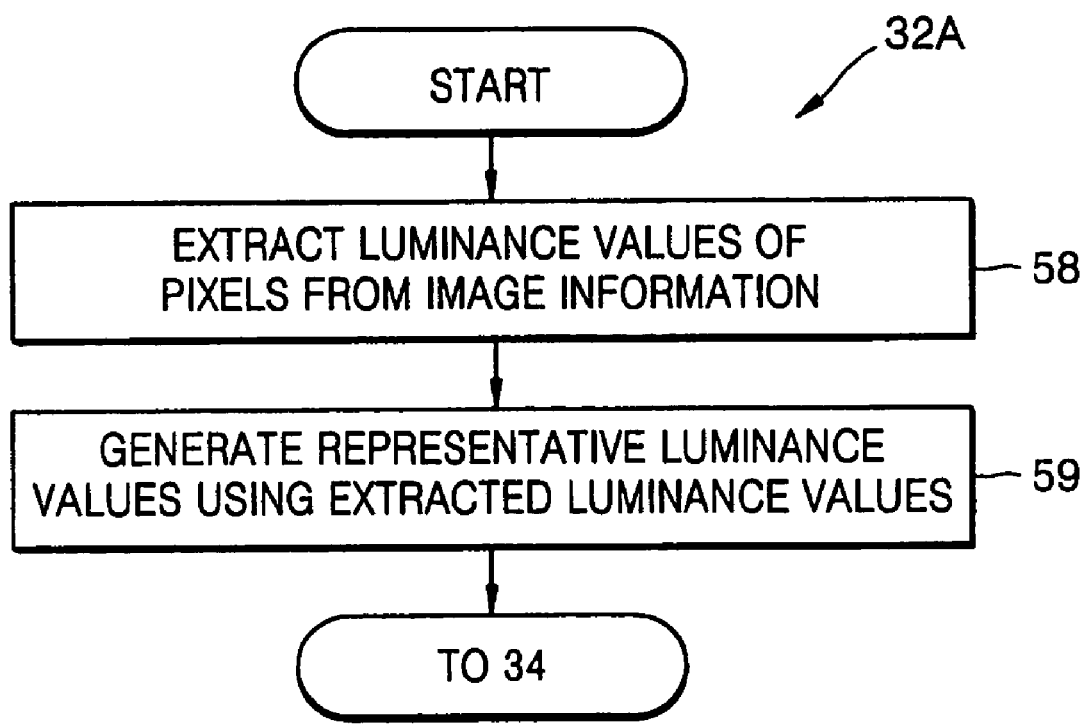
FIG. 4 is a flowchart illustrating an embodiment of operation 32 of FIG. 2.

Reference will now be made in detail to the embodiments of the present invention, examples of which are illustrated in the accompanying drawings, wherein like reference numerals refer to the like elements throughout. The embodiments are described below to explain the present invention by referring to the figures.

Hereinafter, a method of enhancing a local luminance of an image, according to an embodiment of the present invention, will be described in detail with reference to the attached drawings.

FIG. 1 is a flowchart illustrating a method of enhancing a local luminance of an image according to an embodiment of the present invention. The method includes operations 10 and 12 of selecting a local area of a luminance space which represents the luminance of an input image and compensating for a luminance of the local area.

In operation 10, a local area with a luminance to be compensated for is selected from a luminance space which represents the luminance of an input image. Here, the need for compensating for the luminance of the local area may be caused by the ineffective luminance representation characteristic of a display (not shown) or the ineffective luminance characteristic of the input image. The display displays an output image, which will be formed in operation 12, and is included in an apparatus to enhance a local luminance of an image and to perform the method of FIG. 1.

FIG. 2 is a flowchart illustrating an embodiment 10A of operation 10 of FIG. 1. Operation 10A includes operations 30, 32, and 34 of selecting blocks with luminances to be compensated for from blocks into which the input image is segmented.

To perform operation 10A, in operation 30, the input image is segmented into blocks. According to an aspect of the present invention, the blocks into which the input image is segmented may have different sizes. In other words, the input image may be irregularly segmented.

According to another aspect of the present invention, the blocks into which the input image is segmented may have the same size. In other words, the input image may be regularly segmented.

According to still another aspect of the present invention, the blocks into which the input image is segmented may correspond to macro blocks, each of which includes a plurality of micro blocks. Here, the macro blocks may have the same size, and the micro blocks may also have the same size.

One of the above-described aspects may be selected according to the production cost or performance of the apparatus in performing the method for enhancing the local luminance of the image of the present invention. Here, in order not to segment the input image into blocks of too small a size, the input image may be segmented into the macro blocks as described above. When the size of the blocks is excessively small, a selective compensation of the luminance of the local area of the luminance space of the input image may cause an error. Thus, the size of the blocks may be determined according to the size of the display which displays the output image.

FIG. 3 is an exemplary view of the input image which is segmented into the blocks. The input image includes macro blocks 40, 42, 44, and 46.

The input image of FIG. 3 may be segmented into the macro blocks 40, 42, 44, and 46, each of which may be segmented into micro blocks 50, 52, 54, and 56. The size of the macro block 40 is greater than the size of the micro block 50, 52, 54, or 56, and each of the micro blocks 50, 52, 54, and 56 includes at least one pixel. For example, the input image of FIG. 3 may be segmented into macro blocks, each of which includes 15×15 pixels. In this case, if each of the micro blocks has the size of 5×5 pixels, each of macro blocks includes 3×3 micro blocks.

After operation 30, in operation 32, representative luminance values of the respective blocks are extracted using luminance values of pixels included in the respective blocks.

If image information regarding the input image is classified into luminance values and chromaticity values, the luminance values of the image information are used as the luminance values of the pixels used to extract the representative luminance values. For example, when the image information regarding the input image is classified into a luminance value Y and chromaticity values CrCb, the luminance value Y of the image information is used as the luminance value of each of the pixels included in each of the blocks. Here, the luminance value Y and the chromaticity values CrCb may be normalized as in Equation 1:

$$Y=0\sim1$$

$$Cb=-0.5\sim0.5$$

$$Cr=-0.5\sim0.5 \quad (1)$$

FIG. 4 is a flowchart illustrating an embodiment 32A of operation 32 of FIG. 2 of the present invention. Operation 32A includes operations 58 and 59 of extracting the luminances of the pixels from the image information to generate the representative luminance values.

If the image information of the input image is not classified into the luminance values and the chromaticity values, in operation 58, a chromatic coordinate transformation is performed to extract the luminance values of the pixels used to extract the representative luminance values from the image information. For example, when the image information regarding the input image is not classified into the luminance values and the chromaticity values as red (R), green (G), and blue (B) values, the chromatic coordinate transformation as Equation 2 is performed to extract the luminance value Y and the chromaticity values CrCb from R, G, and B image information:

$$Y=0.299 \times R+0.587 \times G+0.114 \times B$$

$$Cb=-0.169 \times R-0.331 \times G+0.5 \times B$$

$$Cr=0.51 \times R-0.419 \times G-0.081 \times B \quad (2)$$

After operation 58, in operation 59, a representative luminance value of a corresponding block is generated using the luminance value Y which has been extracted from the image formation.

According to an aspect of the present invention, in operation 32, an average value of the luminance values of the pixels included in each of the blocks may be determined as a representative luminance value of the corresponding block.

According to another aspect of the present invention, in operation 32, a random luminance value may be selected from the luminance values of the pixels included in each of the blocks, and the selected luminance value may be determined as the representative luminance value of the corresponding block.

For example, assume that in operation 30, the input image is segmented into the macro blocks, each of which is segmented into the micro blocks, as shown in FIG. 3. Here, a representative luminance value of each of the macro blocks 40, 42, 44, and 46 of FIG. 3 may be represented as in Equation 3:

$$Y_m = \frac{1}{N}\sum_N y_n \quad (3)$$

wherein $Y_m$ denotes a representative luminance value of an $m^{th}$ macro block 40, 42, 44, or 46, m(1 m M) denotes the order of M macro blocks included in the input image, N denotes the total number of micro blocks included in the macro block 40, 42, 44, or 46, n (1 n N) denotes the order of N micro blocks, and $y_n$ denotes a representative luminance value of an $n^{th}$ micro block. Here, $y_n$ may be represented as in Equation 4 and may be randomly selected from luminance values of pixels included in the $n^{th}$ micro block:

$$y_n = \frac{1}{I}\sum_I y_i \quad (3)$$

wherein I denotes the total number of pixels included in each of the micro blocks 50, 52, 54, and 56, and $y_i$ denotes a luminance value of an $i^{th}$ pixel among pixels included in each of the micro blocks 50, 52, 54, and 56.

After operation 32, in operation 34, only blocks (hereinafter referred to as compensation blocks) with representative luminance values belonging to a luminance compensation section are selected from the all blocks segmenting the input image. Here, the local area selected in operation 10 includes the representative luminance values of the compensation blocks selected in operation 34. In other words, when a representative luminance value of any block belongs to the luminance compensation section, the block is determined as a luminance compensation block with a luminance to be compensated for.

According to the present invention, the luminance compensation section is set using the luminance or gamma characteristic of the display or the luminance characteristic of the input image. The luminance compensation section may vary. In other words, the start and the end points of the luminance compensation section are variable.

The luminance compensation section may be set before or while the method of FIG. 1 is performed. For example, if an area of the input image in which the luminance or gamma characteristic of the display is ineffective is set to the luminance compensation section, the luminance compensation section may be preset. However, if an area of the input image in which the luminance is ineffectively represented or must be represented in an enhanced fashion is set to the luminance compensation section, the luminance compensation section may be set after operation 32.

Figure 5A:
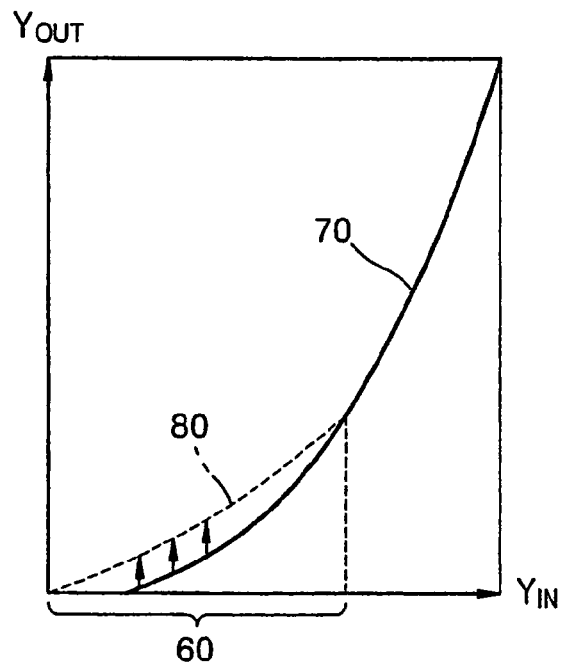
FIGS. 5A, 5B, and 5C are graphs showing the relationship between a luminance value of an input image and a luminance value of an output image.
Figure 5B:
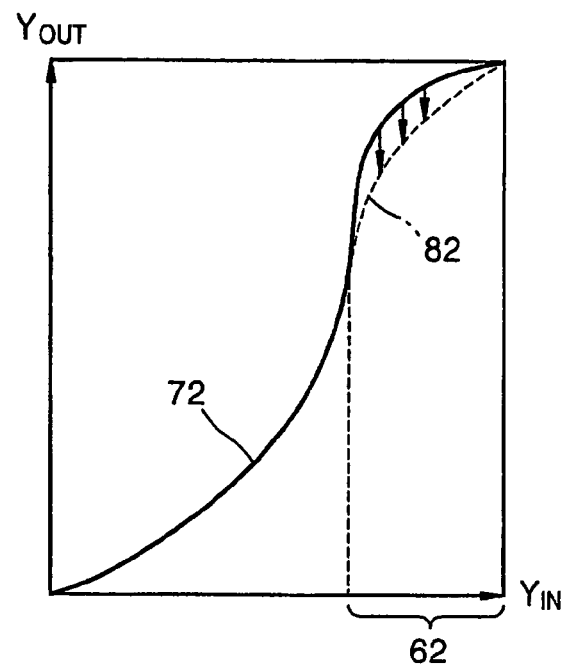
Figure 5C:
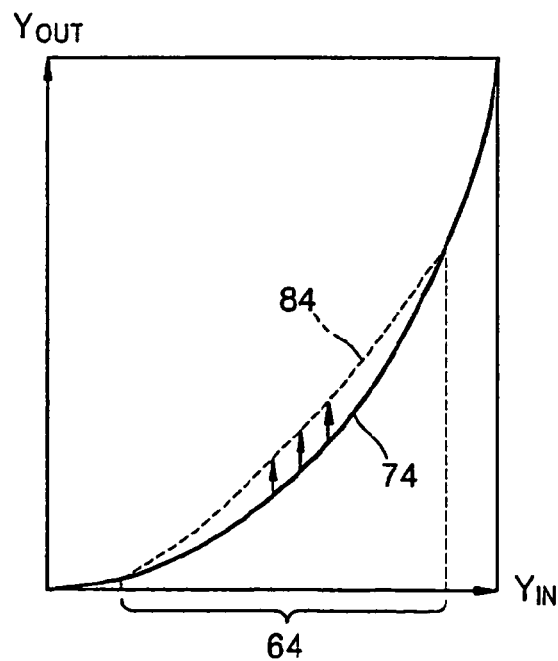

Each of FIGS. 5A, 5B, and 5C is a graph showing the relationship between a luminance value $Y_{IN}$ of an input image and a luminance value $Y_{OUT}$ of an output image. Here, the horizontal axis denotes the luminance value $Y_{IN}$ of the input image, and the vertical axis denotes the luminance value $Y_{OUT}$ of the output image.

For example, the relationship between a luminance value $Y_{IN}$ of a test input image provided to the display and a luminance value $Y_{OUT}$ of an output image corresponding to the test input image may be shown as indicated by a characteristic curve 70, 72, or 74 of FIG. 5A, 5B, or 5C, according to the intrinsic luminance characteristic of the display. In this case, a portion of the characteristic curve 70, 72, or 74 with the ineffective luminance characteristic may be set to a luminance compensation section 60, 62, or 64.

The characteristic curve of 70, 72, or 74 of the input image with the poor luminance characteristic or the luminance characteristic to be enhanced may be shown as in FIG. 5A, 5B, or 5C. In this case, a portion of the characteristic curve of 70, 72, or 74 with the poor luminance characteristic or the luminance characteristic to be enhanced may be set to the luminance compensation section 60, 62, or 64.

If the luminance compensation section is set as shown in FIG. 5A, 5B, or 5C, in operation 34, the block having a representative luminance value belonging to the luminance compensation section 60, 62, or 64 is selected as the compensation block.

After operation 10, in operation 12, the luminance of the selected local area is compensated for.

Figure 6:
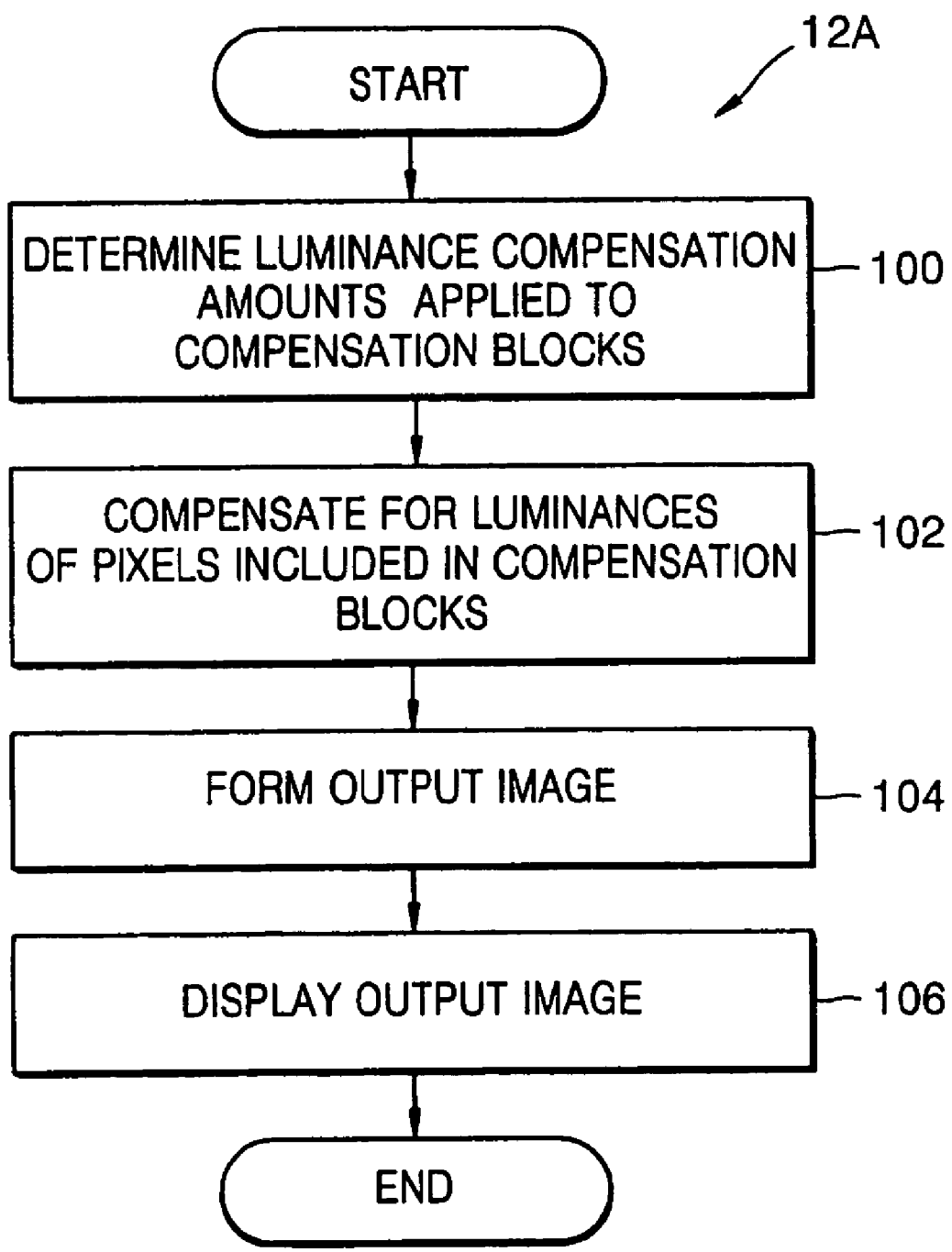
FIG. 6 is a flowchart illustrating an embodiment of operation 12 of FIG. 1.

FIG. 6 is a flowchart illustrating an embodiment 12A of operation 12 of FIG. 1 of the present invention. Operation 12A includes operations 100 and 102 of compensating for luminances of pixels included in compensation blocks and operations 104 and 106 of forming and displaying the output image.

After operation 10, in operation 100, luminance compensation amounts applied to all compensation blocks are determined. Luminance compensation amounts of non-compensation blocks having representative luminance values not belonging to the luminance compensation section are not determined. In other words, the luminance compensation amounts of the non-compensation blocks may be set to "0." According to an embodiment of the present invention, the luminance compensation amounts of the compensation blocks are determined to increase differences between the representative luminance values of the compensation blocks and the representative luminance values of blocks neighboring the compensation blocks. However, the luminance compensation amounts of the compensation blocks may be determined according to the luminance compensation amounts of the neighboring blocks to prevent blocking artifacts caused by sharp variations in the differences between the representative luminance values of the compensation blocks and the representative luminance compensation values of the neighboring blocks.

Here, if the input image is segmented into the macro blocks as previously described, luminance compensation amounts of macro blocks which are the compensation blocks, i.e., macro blocks having representative luminance values belonging to the luminance compensation section, are determined in operation 100.

After operation 100, in operation 102, luminances of pixels included in each of the compensation blocks are compensated for using the luminance compensation amounts of the compensation blocks determined in operation 100. Here, luminance compensation amounts of the pixels included in the compensation blocks may be determined according to the positions of the pixels in the compensation blocks. An embodiment of the luminance compensation amounts of the pixels included in the compensation blocks will be described as follows.

Figure 7:
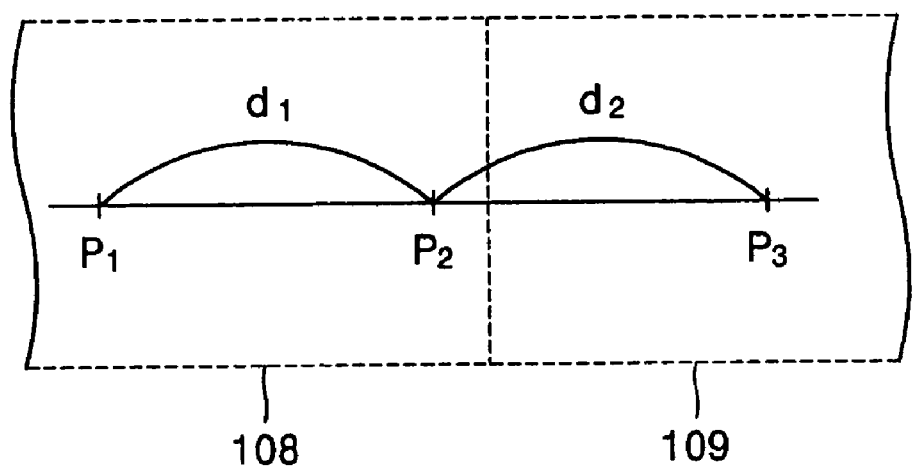

FIG. 7 is an exemplary view illustrating a luminance compensation amount of a random pixel. A compensation block 108 and a neighboring block 109 are shown.

According to an aspect of the present invention, a luminance compensation value C of each of pixels included in the compensation block 108 may be calculated using Equation 5:

$$C = \frac{d_1}{d_1 + d_2} C_1 + \frac{d_2}{d_1 + d_2} C_2 \quad (5)$$

wherein $d_1$ denotes a distance between a position $P_1$ of a pixel on which the luminance compensation amount C is obtained, i.e., a random pixel included in the compensation block 108, and a central position $P_2$ of the compensation block 108, $d_2$ denotes a distance between the position $P_1$ and a central position $P_3$ of the neighboring block 109, $C_1$ denotes the luminance compensation amount of the compensation block 108 determined in operation 100, and $C_2$ denotes the luminance compensation amount of the neighboring block 109 determined in operation 100.

Here, the luminance compensation amount C calculated using Equation 5 is applied to a pixel in the position $P_1$ to compensate for a luminance of the pixel.

As described above, the luminances of the pixels included in each of all compensation blocks of the blocks of the input image are compensated for as in operation 102. As a result, the luminance compensation sections of the characteristic curves 70, 72, and 74 of FIGS. 5A, 5B, and 5C may be adjusted in directions as indicated by arrows to obtain compensated characteristic curves 80, 82, and 84.

According to the present invention, in operation 102, the luminances of the pixels included in each of the compensation blocks may be compensated for according to the saturation of the pixels because, in a case wherein pixels of R and B colors with low luminance characteristics in an YCrCb color space belong to a luminance compensation section that has high saturation, even slightly increasing the luminance of the pixels of R and B colors causes the R and B colors to exceed the color gamut. For example, the saturation of each of the pixels may be inversely proportional to the luminance compensation amount applied to each of the pixels. In other words, as the saturation of each of the pixels is increased, the luminance compensation amount applied to each of the pixels is decreased.

After operation 102, in operation 104, the output image is formed using the non-compensation blocks and the blocks including the luminance compensated pixels. If the image information regarding the input image is classified into the luminance values and the chromaticity values, the output image is formed using the non-compensation blocks and blocks including the luminance compensated pixels. However, if the image information regarding the input image is not classified into the luminance values and the chromaticity values, the luminance values of each of pixels included in the block including the luminance compensated pixels must be inversely transformed into R, G, and B values again, as in Equation 6, in which the luminance values and the chromaticity values are not classified:

$Y=Y+0.0\times Cb+1.403\times Cr$ $G=Y-0.344\times Cb-0.714\times Cr$ $B=Y+1.773\times Cb+0.0\times Cr \quad (6)$ Accordingly, the output image is formed using the non-compensation blocks and blocks including the pixels with the luminances which have undergone the inverse transformation. In other words, the luminance values of the pixels, which have been extracted from the image information in operation 58 of FIG. 4 and compensated for in operation 102, are again blended with the chromaticity values of the pixels in operation 104 to reconstitute the image information which is not classified into the luminance values and the chromaticity values.

After operation 104, in operation 106, the output image is displayed. Here, if the representative luminance values extracted in operation 32 of FIG. 2 have undergone inverse gamma compensation, in operation 106, the output image is gamma compensated for and displayed.

The structure and operation of an apparatus to enhance a local luminance of an image according to an embodiment of the present invention will now be explained with reference to the attached drawings.

Figure 8:
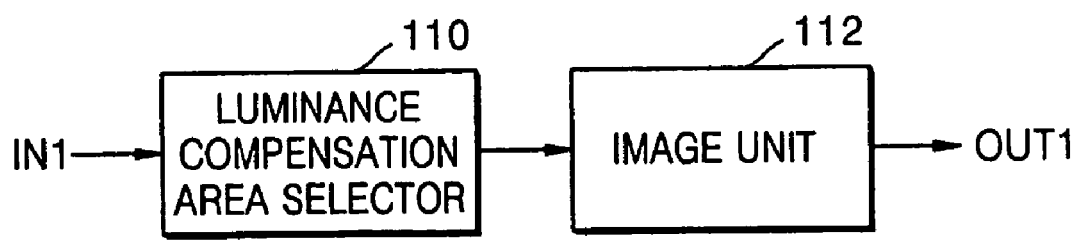
FIG. 8 is a block diagram of an apparatus to enhance a local luminance of an image according to an embodiment of the present invention.

FIG. 8 is a block diagram of an apparatus to enhance a local luminance of an image, according to an embodiment of the present invention. Referring to FIG. 8, the apparatus includes a luminance compensation area selector 110 and an image unit 112.

The apparatus of FIG. 8 performs the method of FIG. 1.

To perform operation 10, the luminance compensation area selector 110 receives an input image via an input node IN1, selects a local area from a luminance space with a luminance to be compensated for, the luminance area representing the luminance of the received input image, and outputs information on the selected local area to the image unit 112.

To perform operation 12, the image unit 112 of FIG. 8 compensates for the luminance of the selected local area identified by the information input from the luminance compensation area selector 110 and outputs the compensation result via an output node OUT1.

Figure 9:
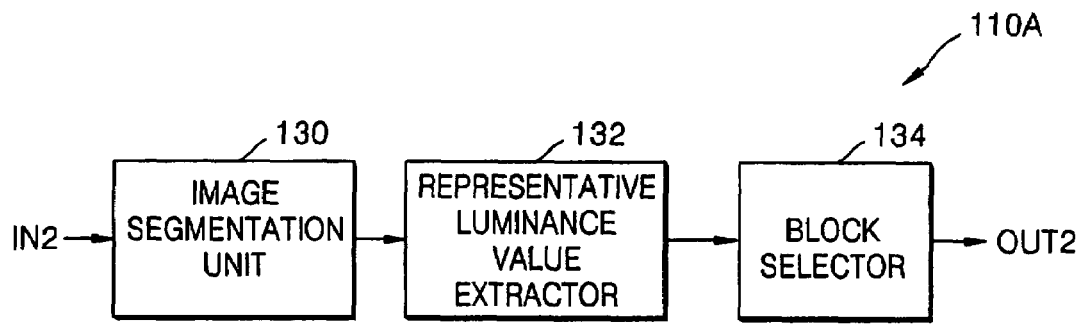
FIG. 9 is a block diagram of an embodiment of an embodiment of a luminance compensation area selector of FIG. 8.

FIG. 9 is a block diagram of an embodiment 110A of the luminance compensation area selector 110 of FIG. 8 according to the present invention. Referring to FIG. 9, the luminance compensation area selector 110A includes an image segmentation unit 130, a representative luminance value extractor 132, and a block selector 134.

The luminance compensation area selector 110A of FIG. 9 performs operation 10A of FIG. 2.

To perform operation 30, the image segmentation unit 130 segments an image, which is input via an input node IN2, into blocks and outputs the segmentation result to the representative luminance value extractor 132.

To perform operation 32, the representative luminance value extractor 132 extracts representative luminance values of the blocks from luminance values of pixels included in each of the blocks input from the image segmentation unit 130 and outputs the extracted representative luminance values to the block selector 134.

To perform operation 34, the block selector 134 selects the compensation blocks with the representative luminance values belonging to the luminance compensation section, using the representative luminance values of the blocks input from the representative luminance value extractor 132 and outputs the select result to the image unit 112 via an output node OUT2.

Figure 10:
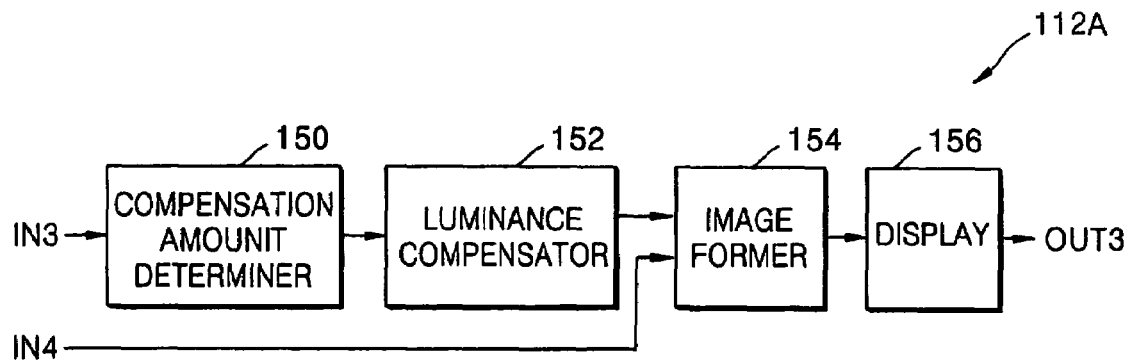
FIG. 10 is a block diagram of an embodiment of an image unit of FIG. 8.

FIG. 10 is a block diagram of an embodiment 112A of the image unit 112 of FIG. 8, according to an embodiment of the present invention. Referring to FIG. 10, the image unit 112A includes a compensation amount determiner 150, a luminance compensator 152, an image former 154, and a display 156.

The image unit 112A of FIG. 10 performs operation 12A of FIG. 6.

To perform operation 100, the compensation amount determiner 150 determines the luminance compensation amount to be applied to the compensation blocks identified by the select result, which is input from the luminance compensation area selector 110 via an input node IN3, and outputs the luminance compensation amount of the compensation blocks to the luminance compensator 152.

To perform operation 102, the luminance compensator 152 compensates for the luminances of the pixels included in each of compensation blocks using the luminance compensation amounts determined by the compensation amount determiner 150 and outputs the compensation result to the image former 154, To perform operation 104, the image former 154 receives information on the blocks including the luminance compensated pixels from the luminance compensator 152, receives information on the non-compensation blocks with the representative luminance values not belonging to the luminance compensation section from the luminance compensation area selector 110 via an input node IN4 to form the output image, and outputs the output image to the display 156.

To perform operation 106, the display 156 displays the output image, which is input from the image former 154, via an output node OUT3.

A computer-readable recording medium that stores a computer program according to an embodiment of the present invention will now be described.

The computer program performs: selecting the local area of the luminance space with the luminance to be compensated for, the luminance space representing the luminance of the input image, and compensating for the luminance of the selected local area.

Here, the selecting of the local area includes: segmenting the input image into the blocks, extracting the representative luminance values of the blocks using the luminance values of the pixels included in each of the blocks, and selecting the compensation blocks with the representative luminance values belonging to the luminance compensation section.

The compensation of the luminance of the selected local area includes: determining the luminance compensation amounts to be applied to the compensation blocks, compensating the luminances of the pixels included in each of compensation blocks using the determined luminance compensation amounts, forming the output image using the blocks including the luminance compensated pixels and the non-compensation blocks with the representative luminance values not belonging to the luminance compensation section, and displaying the output image.

As described above, in a method and an apparatus to enhance a local luminance, and a computer-readable recording medium to store a computer program, according to embodiments of the present invention, the ineffective luminance of a local area of an input image due to the characteristics of a display may be compensated for to compensate for or maximize the ineffective luminance representation ability of the display. Also, since the ineffective or local area of a luminance space of the input image may be enhanced, the local luminance and contrast of the input image may be partially enhanced and the distortion of color components which may be included in a high or low luminance space may be prevented. In particular, since the luminance may be compensated for in the unit of blocks, i.e., only the luminances of compensation blocks may be compensated for, luminance compensation may be performed at a high speed. Moreover, since the luminance of the input image may be compensated for in consideration of the luminances of neighboring areas, the luminance may be compensated for without inducing boundaries with the neighboring areas. In particular, since the local area of the luminance space of the input image may be enhanced, the method of the present invention may be applied to enhance a local contrast of an input image in the fields such as a medical image, an air photo, or the like, in which the luminance distribution of the input image is concentrated on a portion of the input image.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of enhancing a local luminance of an input image, the method comprising:

selecting a local area with a luminance to be compensated for from a luminance space, the luminance space representing a luminance of the input image; and compensating for the luminance of the selected local area, wherein the selecting of the local area comprises:

segmenting the input image into a plurality of blocks;

extracting a representative luminance value of each of the plurality of blocks using luminance values of pixels included in each of the plurality of blocks; and selecting compensation blocks with representative luminance values belonging to a luminance compensation section, wherein the selected local area comprises the representative luminance values of the compensation blocks, and wherein the luminance compensation section is set using a luminance characteristic or a gamma characteristic of a display which displays an output image, the display being included in an apparatus to enhance a local luminance of the input image and to perform the method of enhancing the local luminance of the input image, or wherein the luminance compensation section is set to correspond to a luminance characteristic of the input image, wherein the selecting compensation blocks with representative luminance values comprises:

determining luminance compensation amounts applied to the compensation blocks;

compensating for luminances of pixels included in each of the compensation blocks using the determined luminance compensation amounts;

forming an output image using blocks comprising the luminance compensated pixels and non-compensation blocks with representative luminance values not belonging to the luminance compensation section; and displaying the output image, and wherein the compensation for the luminances of the pixels included in each of the compensation blocks using the determined luminance compensation amounts comprises:

calculating a luminance compensation amount C of each of the pixels included in the compensation blocks using an Equation below:

$$C = \frac{d_1}{d_1 + d_2} C_1 + \frac{d_2}{d_1 + d_2} C_2$$

wherein $d_1$ denotes a distance between a position of a pixel with the luminance compensation amount C and a central position of the compensation block, $d_2$ denotes a distance between the position of the pixel with the luminance compensation amount C and a central position of the neighboring block, $C_1$ denotes the luminance compensation amount of the compensation block, and $C_2$ denotes the luminance compensation amount of the neighboring block; and compensating for the luminance of a corresponding pixel using the luminance compensation amount C.

2. The method of claim 1, wherein the extracting of the representative luminance value of each of the plurality of blocks comprises:

extracting the luminance values of the pixels used to extract the representative luminance values from image information of the input image by performing a color coordinate transformation; and generating the representative luminance values using the extracted luminance values.

3. The method of claim 1, wherein each of the blocks segmenting the input image has a predetermined size.

4. The method of claim 1, wherein each of the plurality of blocks segmenting the input image is a macro block comprising a plurality of micro blocks.

5. The method of claim 1, wherein the representative luminance value of each of the plurality of blocks is extracted by calculating an average value of the luminance values of the pixels included in each of the plurality of blocks.

6. The method of claim 1, wherein the representative luminance value of each of the plurality of blocks is extracted by selecting a random luminance value of the luminance values of the pixels included in each of the plurality of blocks.

7. The method of claim 1, wherein the luminance compensation section is variable.

8. The method of claim 1, wherein the luminance compensation amounts applied to the compensation blocks are determined to increase differences between the representative luminance values of the compensation blocks and representative luminance values of blocks neighboring the compensation blocks.

9. The method of claim 1, wherein the compensation for the luminances of the pixels included in each of the compensation blocks comprises: compensating for the luminances of the pixels included in each of the compensation blocks according to saturation of the pixels.

10. An apparatus to enhance a local luminance of an input image, the apparatus comprising:

a luminance compensation area selector which selects a local area with a luminance to be compensated for from a luminance space, the luminance space representing a luminance of the input image;

an image unit which compensates for the luminance of the selected local area, an image segmentation unit which segments the input image into a plurality of blocks;

a representative luminance value extractor which extracts a representative luminance value of each of the plurality of blocks from luminance values of pixels included in each of the plurality of blocks; and a block selector which selects compensation blocks with representative luminance values belonging to a luminance compensation section, wherein the selected local area comprises the representative luminance values of the compensation blocks, and wherein the luminance compensation section is set using a luminance characteristic or a gamma characteristic of a display which displays an output image, the display being included in the apparatus to enhance a local luminance of the input image and to perform a method of enhancing the local luminance of the input image, or wherein the luminance compensation section is set to correspond to a luminance characteristic of the input image, wherein the image unit comprises:

a compensation amount determiner which determines luminance compensation amounts applied to the compensation blocks;

a luminance compensator which compensates for luminances of the pixels included in each of the compensation blocks using the determined luminance compensation amounts;

an image former which forms an output image using blocks comprising the luminance compensated pixels and non-compensation blocks with representative luminance values not belonging to luminance compensation blocks; and a display which displays the output image, wherein the compensation for the luminances of the pixels included in each of the compensation blocks using the determined luminance compensation amounts comprises:

calculating a luminance compensation amount C of each of the pixels included in the compensation blocks using an Equation below:

$$C = \frac{d_1}{d_1 + d_2} C_1 + \frac{d_2}{d_1 + d_2} C_2$$

wherein $d_1$ denotes a distance between a position of a pixel with the luminance compensation amount C and a central position of the compensation block, $d_2$ denotes a distance between the position of the pixel with the luminance compensation amount C and a central position of the neighboring block, $C_1$ denotes the luminance compensation amount of the compensation block, and $C_2$ denotes the luminance compensation amount of the neighboring block; and compensating for the luminance of a corresponding pixel using the luminance compensation amount C.

11. A computer-readable recording medium that stores a computer program that enhances a local luminance of an input image, the computer program performing:

selecting a local area with a luminance to be compensated for from a luminance space, the luminance space representing a luminance of the input image; and compensating for the luminance of the selected local area, wherein the selecting of the local area comprises:

segmenting the input image into a plurality of blocks;

extracting a representative luminance value of each of the plurality of blocks using luminance values of pixels included in each of the plurality of blocks; and selecting compensation blocks with representative luminance values belonging to a luminance compensation section, wherein the selected local area comprises the representative luminance values of the compensation blocks, and wherein the luminance compensation section is set using a luminance characteristic or a gamma characteristic of a display which displays an output image, the display being included in an apparatus to enhance a local luminance of the input image and to perform a method of enhancing the local luminance of the input image, or wherein the luminance compensation section is set to correspond to a luminance characteristic of the input image, wherein the selecting compensation blocks with representative luminance values belonging to a luminance compensation section comprises:

determining luminance compensation amounts applied to the compensation blocks;

compensating for luminances of pixels included in each of the compensation blocks using the determined luminance compensation amounts;

forming an output image using blocks comprising the luminance compensated pixels and non-compensation blocks with representative luminance values not belonging to the luminance compensation section; and displaying the output image, wherein the compensation for the luminances of the pixels included in each of the compensation blocks using the determined luminance compensation amounts comprises:

calculating a luminance compensation amount C of each of the pixels included in the compensation blocks using an Equation below:

$$C = \frac{d_1}{d_1 + d_2} C_1 + \frac{d_2}{d_1 + d_2} C_2$$

wherein $d_1$ denotes a distance between a position of a pixel with the luminance compensation amount C and a central position of the compensation block, $d_2$ denotes a distance between the position of the pixel with the luminance compensation amount C and a central position of the neighboring block, $C_1$ denotes the luminance compensation amount of the compensation block, and $C_2$ denotes the luminance compensation amount of the neighboring block; and compensating for the luminance of a corresponding pixel using the luminance compensation amount C.

12. A computer-readable recording medium that stores a computer program that enhances a local luminance of an input image, the computer program performing:

segmenting a selected local area of the input image into a plurality of blocks;

extracting representative luminance values of pixels of the plurality of blocks;

selecting a luminance compensation section comprising compensation blocks having the representative luminance values; and compensating for the luminance of the selected local area, wherein the luminance compensation section is set using a luminance characteristic or a gamma characteristic of a display which displays an output image, the display being included in an apparatus to enhance a local luminance of the input image and to perform a method of enhancing the local luminance of the input image, or wherein the luminance compensation section is set to correspond to a luminance characteristic of the input image, wherein the selecting the luminance compensation section comprises:

determining luminance compensation amounts applied to the compensation blocks;

compensating for luminances of pixels included in each of the compensation blocks using the determined luminance compensation amounts;

forming an output image using blocks comprising the luminance compensated pixels and non-compensation blocks with representative luminance values not belonging to the luminance compensation section; and displaying the output image, wherein the compensation for the luminances of the pixels included in each of the compensation blocks using the determined luminance compensation amounts comprises:

calculating a luminance compensation amount C of each of the pixels included in the compensation blocks using an Equation below:

$$C = \frac{d_1}{d_1 + d_2} C_1 + \frac{d_2}{d_1 + d_2} C_2$$

wherein $d_1$ denotes a distance between a position of a pixel with the luminance compensation amount C and a central position of the compensation block, $d_2$ denotes a distance between the position of the pixel with the luminance compensation amount C and a central position of the neighboring block, $C_1$ denotes the luminance compensation amount of the compensation block, and $C_2$ denotes the luminance compensation amount of the neighboring block; and compensating for the luminance of a corresponding pixel using the luminance compensation amount C.

13. An apparatus to enhance a local luminance of an input image, the apparatus comprising:

an image segmentation unit to segment a selected local area of the input image into a plurality of blocks;

a representative luminance value extractor to extract representative luminance values of pixels of the plurality of blocks;

a block selector to select a plurality of blocks of a luminance compensation section comprising compensation blocks having the representative luminance values; and a luminance compensator to compensate for the luminance of the selected local area, wherein the luminance compensation section is set using a luminance characteristic or a gamma characteristic of a display which displays an output image, the display being included in an apparatus to enhance a local luminance of the input image and to perform the method of enhancing the local luminance of the input image, or wherein the luminance compensation section is set to correspond to a luminance characteristic of the input image, wherein the block selector comprises:

a compensation amount determiner to determine luminance compensation amounts applied to the compensation blocks;

a luminance compensator to compensate for luminances of pixels included in each of the compensation blocks using the determined luminance compensation amounts;

an image former to form an output image using blocks comprising the luminance compensated pixels and non-compensation blocks with representative luminance values not belonging to the luminance compensation section; and a display to display the output image, wherein the compensation for the luminances of the pixels included in each of the compensation blocks using the determined luminance compensation amounts comprises:

calculating a luminance compensation amount C of each of the pixels included in the compensation blocks using an Equation below:

$$C = \frac{d_1}{d_1 + d_2} C_1 + \frac{d_2}{d_1 + d_2} C_2$$

wherein $d_1$ denotes a distance between a position of a pixel with the luminance compensation amount C and a central position of the compensation block, $d_2$ denotes a distance between the position of the pixel with the luminance compensation amount C and a central position of the neighboring block, $C_1$ denotes the luminance compensation amount of the compensation block, and $C_2$ denotes the luminance compensation amount of the neighboring block; and compensating for the luminance of a corresponding pixel using the luminance compensation amount C.

* * * * *